UNITED STATES PATENT OFFICE.

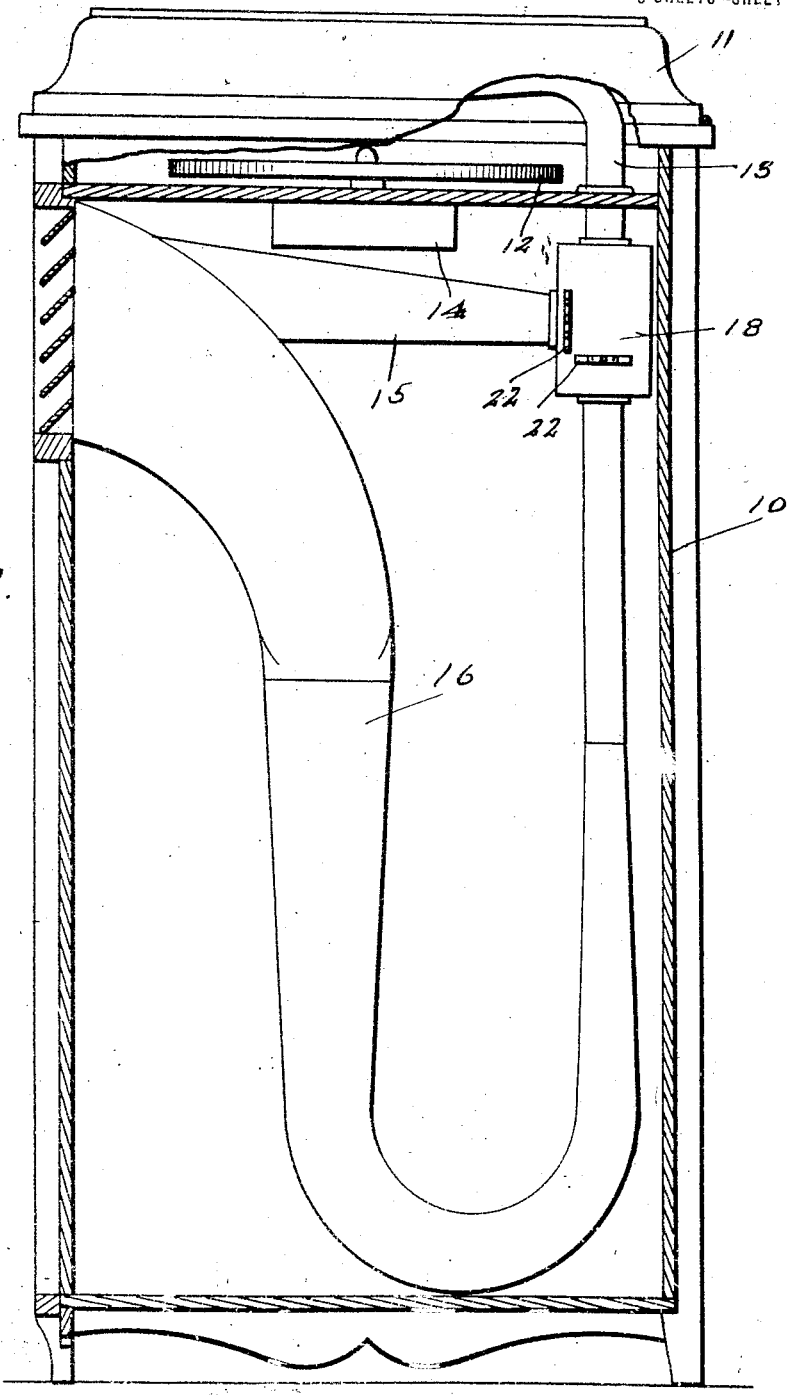

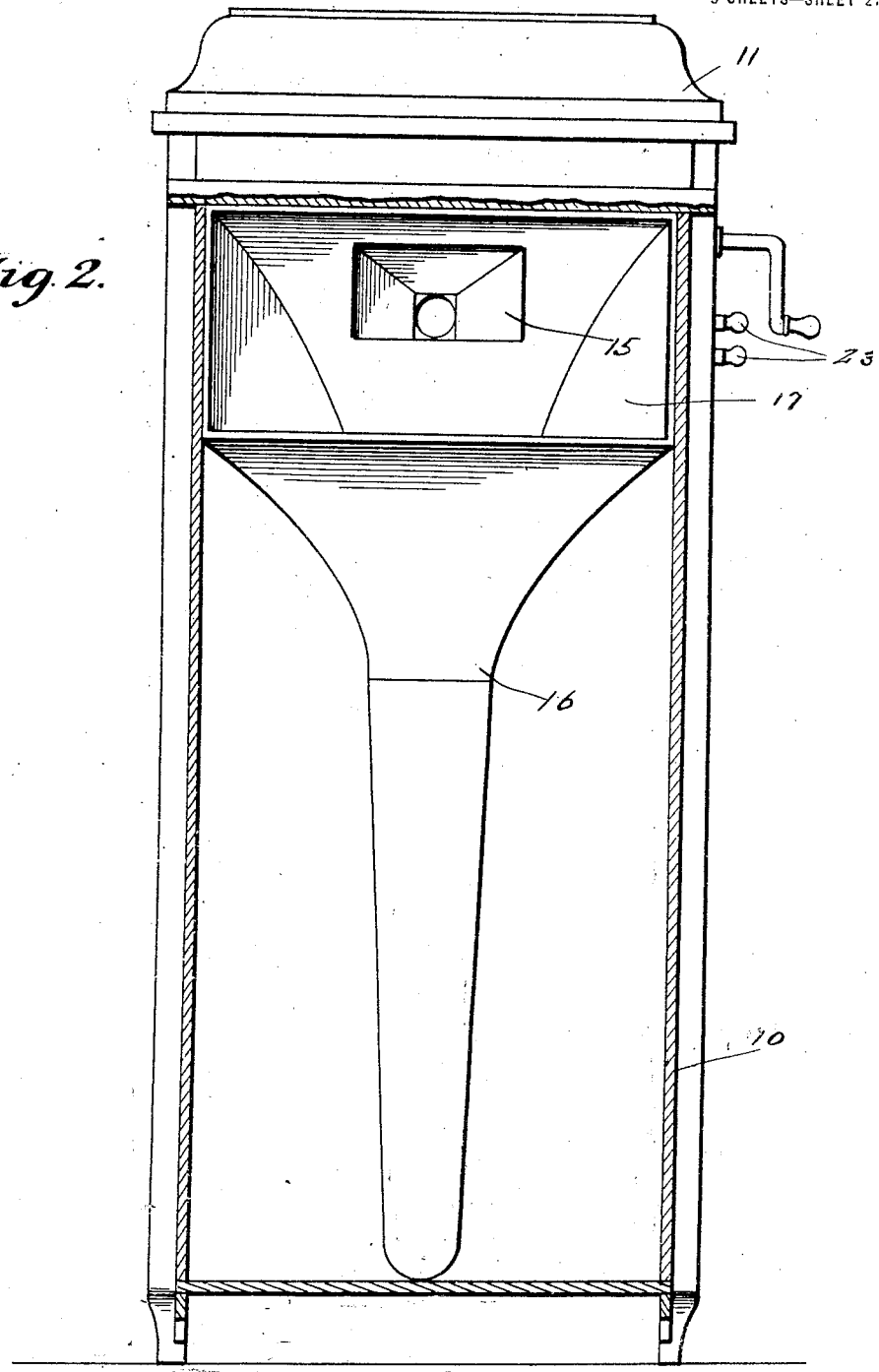

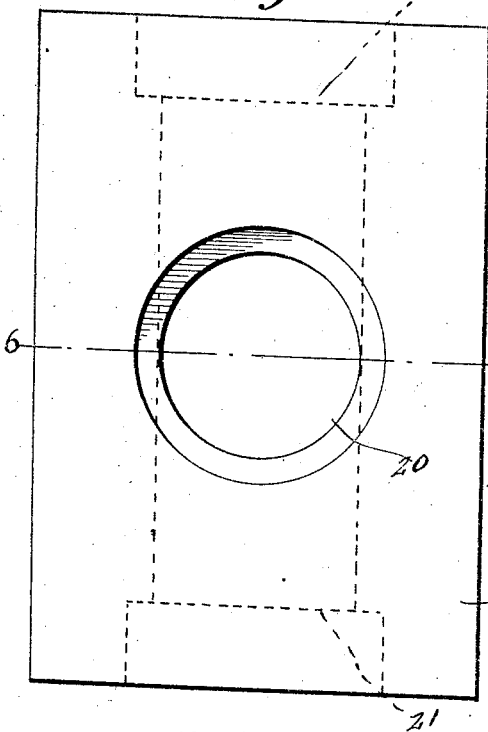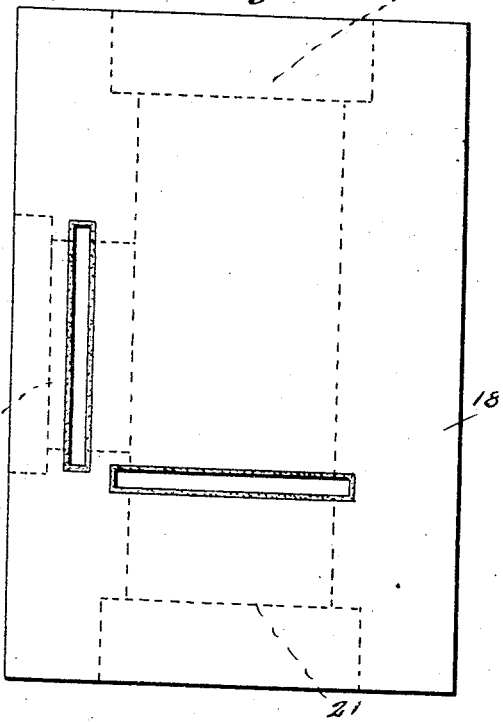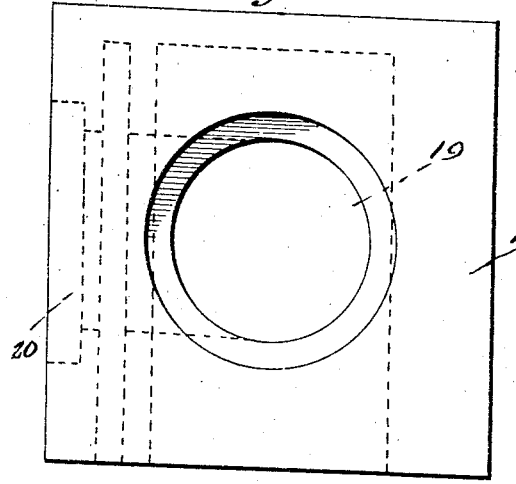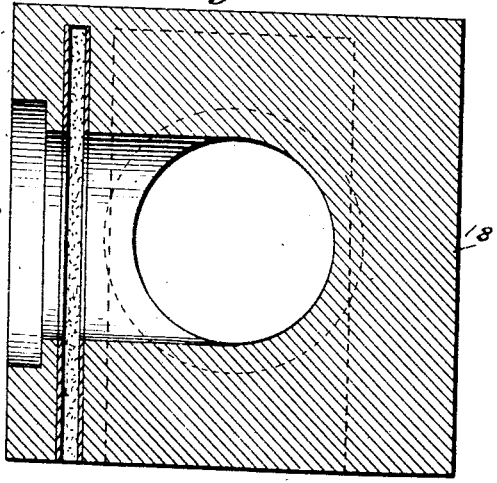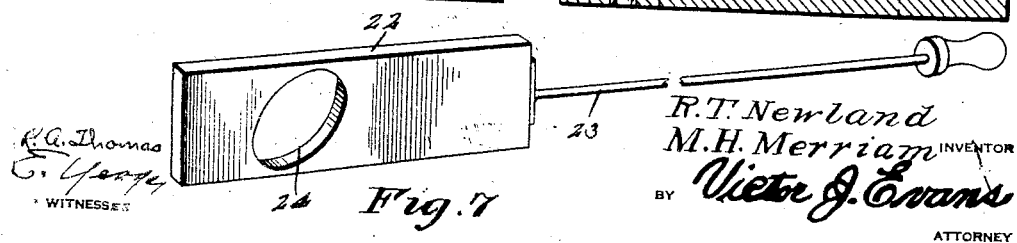

ROY T. NEWLAND AND MELVEL MERRIAM, OF BUTTE, MONTANA, ASSIGNORS OF ONE-HALF TO ADOLPH PINCUS AND WILLIAM MEYER, BOTH OF BUTTE, MONTANA.

TALKING-MACHINE.

1,401,277.  Specification of Letters Patent.  Patented Dec. 27, 1921.

Application filed August 3, 1920. Serial No. 401,072.

*To all whom it may concern:*

Be it known that we, ROY T. NEWLAND and MELVEL MERRIAM, citizens of the United States, residing at Butte, in the county of Silverbow and State of Montana, respectively, have invented new and useful Improvements in Talking-Machines, of which the following is a specification.

This invention relates to talking machines or the like, and has for its chief characteristic the provision of a plurality of horns or sound conveying channels all of which communicate and have a common outlet, the horns or channels being of different size and configuration, adapted to be singly used, the largest one being used for orchestral music, xylophone or the like, while the small horn is used for word music, especially delivered by high pitched voices.

Another important object of the invention resides in the novel construction of means for controlling the communication between the respective horns or sound conveying channels, so that any particular horn or the like can be used at the will of the operator.

The nature and advantages of the invention will be better understood when the following detailed description is read in connection with the accompanying drawings, the invention residing in the construction, combination and arrangement of parts as claimed.

In the drawings forming part of this application like numerals of reference indicate similar parts in the several views, and wherein:—

Figure 1 is an enlarged side elevation of the machine partly in section.

Fig. 2 is a front elevation, and partly in section.

Fig. 3 is a front elevation of the sound trap with which the horns and sound conveying channels communicate.

Fig. 4 is a top plan view thereof.

Fig. 5 is a side elevation.

Fig. 6 is a sectional view taken on line 6—6 of Fig. 3.

Fig. 7 is a detail view of one of the slides.

Referring to the drawing in detail, 10 indicates the cabinet of the machine which is provided with the usual cover 11. A turn table 12 is arranged in the usual manner while swingingly mounted with respect to this table is the tone arm 13. The motor is indicated at 14.

As shown in this specific instance, the invention embodies two horns or sound conveying channels indicated at 15 and 16 respectively, although any number of horns or channels may be used if it be found desirable without departing from the spirit of the invention.

Both of these horns or channels communicate with each other and have a common outlet or bell 17. These horns or channels also communicate with the tone arm through the trap 18. This trap is clearly illustrated in Figs. 3 to 6 inclusive, and is preferably of rectangular formation in cross section. The trap is also constructed from any suitable material, metal being eliminated in its construction to render the trap as sound-proof as possible. The trap has an opening 19 in the top thereof which receives the adjacent end of the tone arm 13, and another opening in the front wall indicated at 20 which receives the adjacent end of the horn 15, while the trap is further provided with an opening 21 in the bottom to receive the adjacent extremity of the horn 16. Manifestly, the sound is conveyed through the tone arm 13 into the trap 18 from where it passes through the outlet opening 17 of the machine through either of the horns or sound conveying channels. The horns or sound conveying channels are adapted to be singly used, and in order to control communication between the respective horns and the trap 18, we provide a slide 22 equipped with a handle 23, for each of the horns or channels 15 and 16 respectively. The slide 22 is also constructed from material other than metal which is sound proof, and is provided with an enlarged opening 24, which is adapted to be brought into and out of registration with the open end of the particular horn or channel with which it is used. The slides 22 are arranged at right angles to each other and operate through suitable openings in the trap 18 as shown. The horn or channel 16 projects downwardly from the bottom of the trap at a point in close proximity to the bottom of the casing or cabinet 10 and is then curved upwardly terminating at a point in close proximity to the top of the cabinet as shown. The horn 15 extends directly from the front wall of the trap 18 toward the front of the cabinet opening into the horn 16 so that both of the horns or sound conveying channels have but a single outlet opening or bell 17. The horn 15 which is the smallest of the two, gives about the same quality of music as any standard make of machine, and is singly used with high pitched voices, and also used in conjunction with treble instruments such as xylophone or the like, while the horn 16 is used for orchestra music, saxophone, violin music or the like. The sound is conveyed downwardly through the horn and thence upwardly through the bell 17, the particular configuration modulating the tone as will be readily understood.

While it is believed that from the foregoing description the nature and advantages of the invention will be readily understood, we desire to have it known that what is herein shown and described is merely illustrative, that we do not limit ourselves to this construction and arrangement of parts, and that such changes may be resorted to when desired as fall within the scope of what is claimed.

What we claim:—

1. In a talking machine, the combination of a tone arm, a trap communicating with one end of the tone arm, a horn projecting from the front wall of said trap and communicating therewith, a second horn depending from the bottom of the trap and communicating therewith, said second horn being curved upwardly and connected with the first mentioned horn, whereby said horns have a single outlet, and means operating within the said trap for establishing communication between the latter, for either or both of said horns.

2. In a talking machine, the combination of a tone arm, a trap receiving said arm at the upper end thereof, a horn projecting from the front wall of the trap and horizontally disposed, a sound horn depending from the bottom of the trap and curved upwardly and receiving the first mentioned horn, whereby both of said horns have a single outlet, said trap being formed with passages arranged at right-angles to each other, and a slide valve arranged in each passage and operating to control the communication between either or both of the said horns and trap.

In testimony whereof we affix our signatures.

ROY T. NEWLAND.
MELVEL MERRIAM.